UNITED STATES PATENT OFFICE.

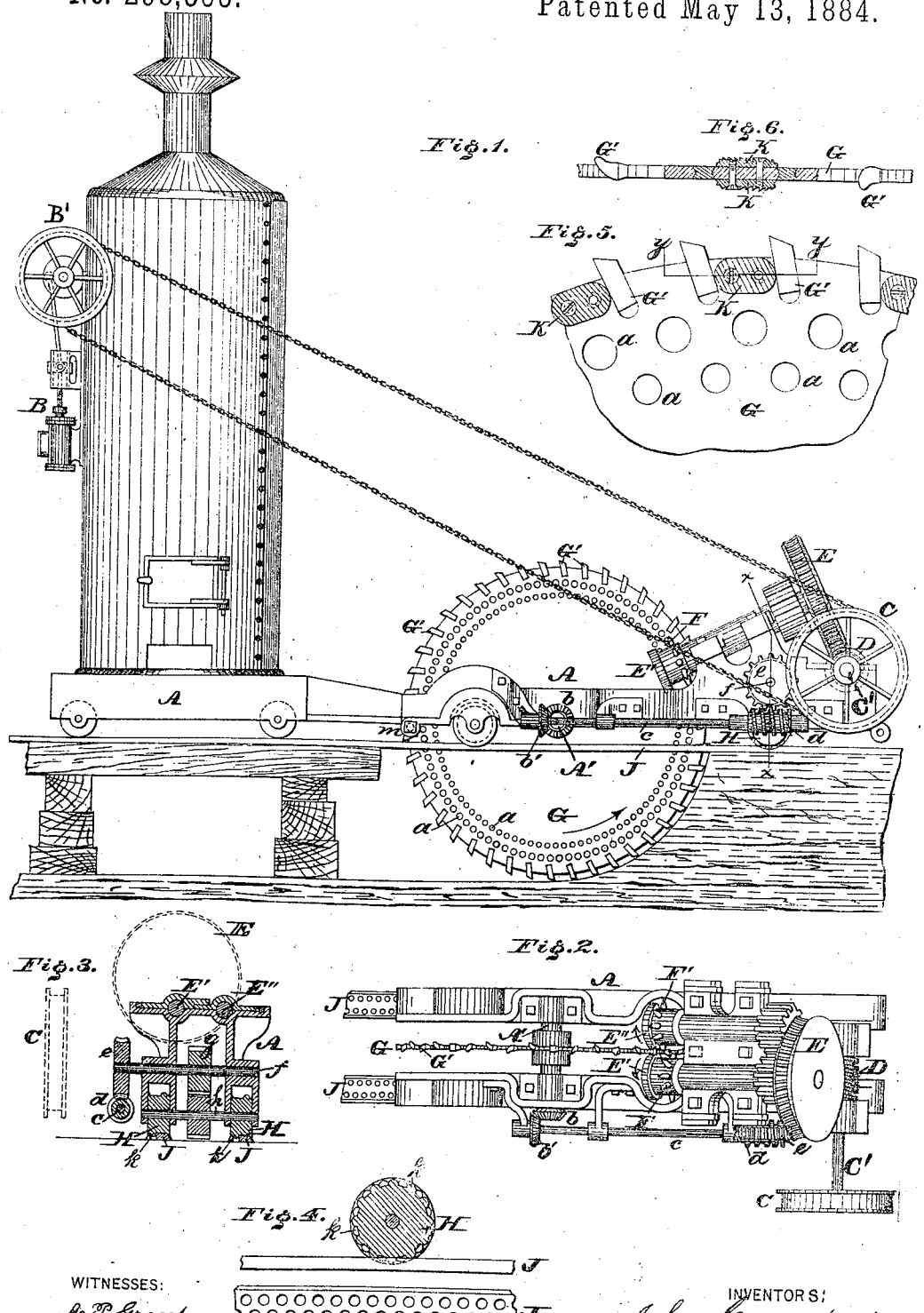

JOHN CRUMP AND RICHARD BRERETON, OF PHILADELPHIA, PA.

ROTARY QUARRIER AND STONE-SHAPER.

SPECIFICATION forming part of Letters Patent No. 298,353, dated May 13, 1884.

Application filed July 24, 1883. (No model.)

*To all whom it may concern:*

Be it known that we, JOHN CRUMP and RICHARD BRERETON, both citizens of the United States, and residents of the city and county of Philadelphia, State of Pennsylvania, have invented a new and useful Improvement in Rotary Quarriers and Stone-Shapers, which improvement is fully set forth in the following specification and accompanying drawings, in which—

Figure 1 is a side elevation of a rotary quarrier and stone-shaper embodying our invention. Fig. 2 is a top view of a portion thereof. Fig. 3 is a vertical section in line $x\,x$, Fig. 1. Fig. 4 is a view of a detached portion, partly sectional. Fig. 5 is a side elevation of a portion of the cutter enlarged. Fig. 6 is an edge view thereof, partly sectional, in line $y\,y$, Fig. 5.

Similar letters of reference indicate corresponding parts in the several figures.

Our invention consists, in part, of improvements in the rotary quarrier and stone-shaper for which Letters Patent of the United States No. 265,946 were granted to us on the 17th day of October, 1882, whereby the cutter is operated and the supporting-carriage thereof simultaneously advanced with the motive power attached.

It also consists in providing the carriage with means for preventing the same from slipping on the tracks.

It also consists in providing the cutter with means for smoothing the cut stone.

Referring to the drawings, A represents a frame or carriage, which is run on tracks placed on the stone to be cut, and on which is supported a steam-engine, B, the power whereof is transmitted by the power-wheel B' to a band-wheel, C, whose shaft C' is mounted on said carriage A and carries a worm, D, the steam-generator being also supported on the carriage.

In lieu of a steam-engine, we may employ any other motor, the same, however, being sustained on the carriage A, and, furthermore, gear the wheel C directly with one of the wheels of the engine.

E represents a worm-wheel, which engages with the worm D, and is secured to a longitudinally-extending shaft, E', the bearings whereof are on the carriage A. Said shaft carries a series of radially-arranged spurs or studs, F, and is geared with a shaft, E'', which carries a series of radially-arranged spurs or studs, F', it being noticed that the studs F F' are located on opposite sides of a rotary cutter, G, and engage with openings $a$ therein, whereby the rotation of the shafts E' E'' operates said cutter, the direction of rotation of the latter being indicated by the arrow, Fig. 1. The cutter has its shaft A' mounted on the carriage A, and to said shaft is keyed or otherwise secured a bevel-pinion, $b$, with which meshes a pinion, $b'$, whose shaft $c$ is mounted on the carriage A, and extends in the longitudinal direction thereof, said shaft $c$ having also secured to it a worm, $d$, which engages with a worm-wheel, $e$, the shaft $f$ of which is geared, as at $g$, with a shaft, $h$, whose ends have secured to them the rollers or wheels H of the carriage, the shafts $f\,h$ having evidently their bearings on said carriage.

It will be seen that when the engine is set in motion the power thereof is communicated by the intermediate mechanism to the shafts E' E'', and consequently to the cutter G, whereby the stone beneath the carriage is expeditiously cut or channeled, it being noticed that as the direction of rotation of the cutter is from below upward the carriage is held firmly on the top of the stone, and the cuttings or chips are brought to the surface, and thereby removed. Simultaneously with the rotation of the cutter G motion is imparted by the shaft A' of said cutter and the connected mechanism to the rollers or wheels H of the carriage, the effect whereof is to advance the carriage, with its superimposed parts, and force the cutter constantly against the stone, so that the cutting of the same is expeditiously performed.

In the operation of the cutter and carriage the mechanism therefor is properly timed or adjusted, so that the feeding of the cutter is in harmony with the power imparted to the same, and the best results are obtained without injury to the cutter or strain on the mechanism.

The peripheries of the wheels H are formed with studs, spurs, or teats $k$, and the track J, on which the carriage is run, is perforated or pierced at intervals to accord with the studs $k$, so that when power is imparted to the wheels their studs enter the perforations of the tracks, whereby the wheels take firm hold of the tracks, and are thus prevented from slipping. In the present case the openings in the tracks are arranged in two rows and alternating or staggered, (see Fig. 4,) and the studs $k$ are correspondingly arranged, thus increasing the number of studs and insuring the engagement of the wheels and tracks.

The cutter G, which is of the form of a disk, similar to a circular saw, or may be composed of a peripheral rim secured by arms to a hub, has detachable teeth or bits G', and to opposite sides of the cutter, between some or all of the bits, are secured plates K, having serrated surfaces, somewhat like rasps or files, the thickness of the plates being slightly greater than that of the bits, whereby, when the cutter is in operation, the plates K, following the action of the bits, come in contact with the sides of the cut stone and trim and smooth the same in a desirable manner, avoiding subsequent manipulations to accomplish such result.

If desired, the rollers or wheels H may be mounted on the shafts $f$, in which case the gearing $g$ and shaft $h$ will be dispensed with.

The portion of the carriage A which supports the engine or motor is detachably connected, as at $m$, with the portion which supports the cutter and its operating mechanism, for convenience of locating, removing, and transporting the device, and other purposes.

Having thus described our invention, what we claim as new, and desire to secure by Letters Patent, is—

A rotary quarrier and stone-shaper consisting of the carriage A, engine B, with driving-wheel B', band-wheel C, gear-wheel D on the band-wheel shaft C', two shafts, E' E'', geared together, the gear-wheel E on the shaft E' meshing with the gear-wheel D, studs F F' on the shafts E' E'', the rotary cutter G, with openings $a$ for the studs F F', the cutter-shaft A', the shaft $c$, gearing with the cutter-shaft, the shaft $f$, geared with said shaft $c$, the shaft $h$, geared with the shaft $f$, and the carriage-wheels H on the shaft $h$, said engine being supported on the carriage, and the band-wheel shaft C', the shafts E' E'', the cutter-shaft A', and the shafts $c$ $f$ $h$ having their bearings on said carriage, the parts being constructed and operating substantially as and for the purpose set forth.

JOHN CRUMP.
RICHARD BRERETON.

Witnesses:
JOHN A. WIEDERSHEIM.
A. P. GRANT.